United States Patent [19]

McDaniel et al.

[11] 4,316,807
[45] Feb. 23, 1982

[54] VISCOSIFYING AGENT

[75] Inventors: Carl V. McDaniel, Laurel; Nelson S. Marans, Silver Spring, both of Md.

[73] Assignee: W. R. Grace & Co., New York, N.Y.

[21] Appl. No.: 892,543

[22] Filed: Apr. 3, 1978

[51] Int. Cl.³ .................................................. C09K 7/00
[52] U.S. Cl. ............................. 252/8.5 A; 252/8.5 C; 252/316
[58] Field of Search ................. 252/8.5 A, 8.5 C, 317, 252/316, 8.5 R

[56] References Cited
U.S. PATENT DOCUMENTS

| | | | |
|---|---|---|---|
| 2,632,736 | 3/1953 | Curie | 252/358 |
| 2,676,182 | 4/1954 | Daubt et al. | 260/448.2 |
| 2,802,850 | 8/1957 | Wetzel | 260/448.2 |
| 3,077,460 | 2/1963 | Fortess et al. | 260/29.2 |
| 3,592,834 | 7/1971 | Buchman et al. | 268/448.8 A |
| 3,810,843 | 5/1974 | Sluzarcyuk et al. | 252/313 S |
| 3,946,061 | 3/1976 | Buchman et al. | 260/448.8 R |
| 3,951,842 | 4/1976 | Maxson et al. | 252/8.5 B |

Primary Examiner—J. L. Barr
Attorney, Agent, or Firm—Howard J. Troffkin

[57] ABSTRACT

Silane modified inorganic reaction product compositions, water based systems containing said compositions, drilling fluids containing said compositions and a method of drilling bore holes using said drilling fluids, wherein the silane-modified inorganic compositions comprise an aqueous solution, suspension or dispersion of a reaction product of a hydrous inorganic material selected from silicon oxide, aluminum oxide or mixtures thereof with from about 0.01 moles to about 0.3 moles per mole of oxide of an organo silane represented by the general formula $$R_xSiR'_{4-x}$$

wherein R represents a $C_1$-$C_{20}$ hydrocarbon radical, R' represents an alkoxy or halo radical and x is an integer of 1 to 3. The subject compositions unexpectedly increase the viscosity while imparting pseudoplastic properties to aqueous systems.

43 Claims, 1 Drawing Figure

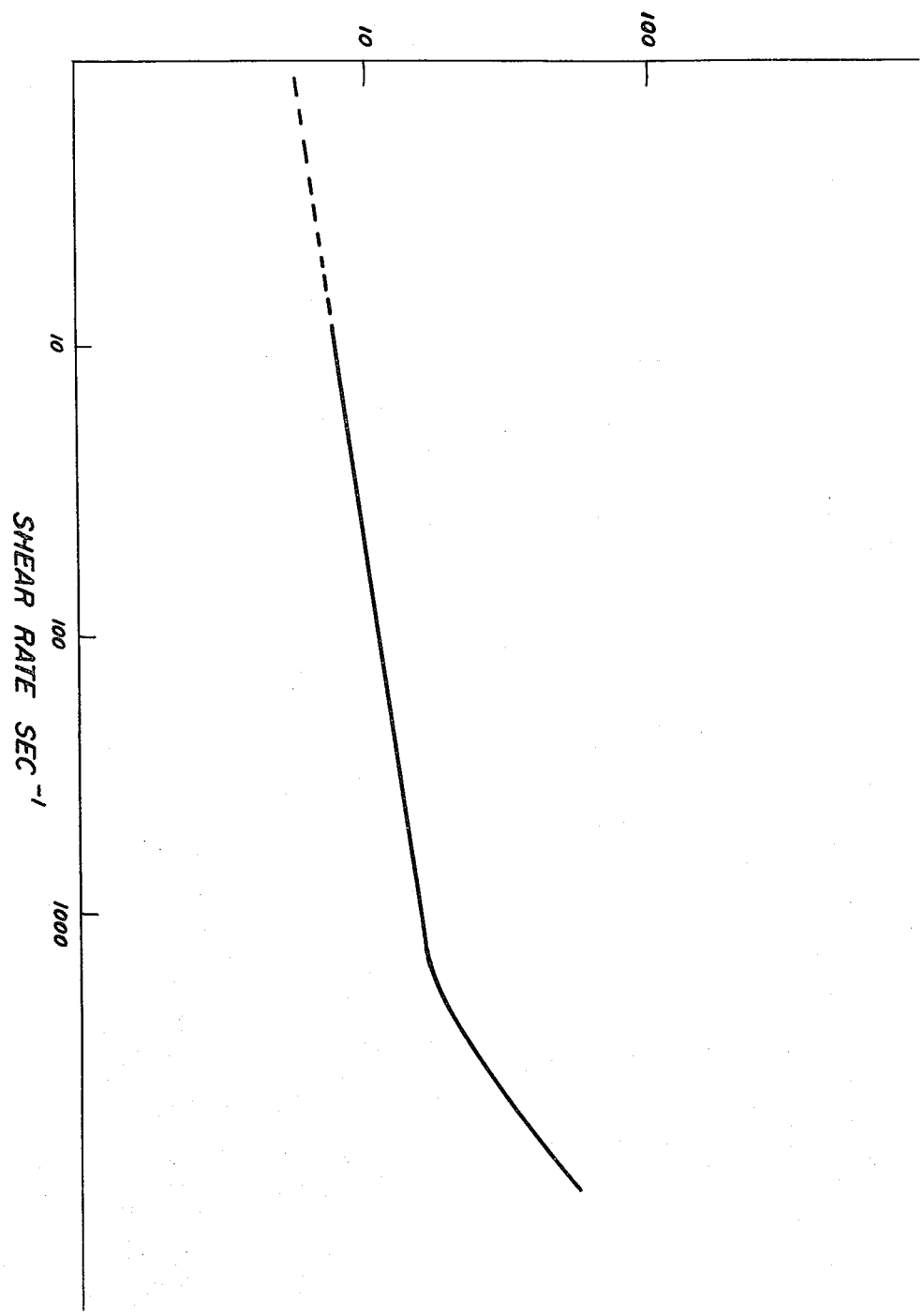

VISCOSIFYING AGENT

BACKGROUND OF THE INVENTION

The present invention relates to the formation and utilization of silane modified inorganic polymeric materials which impart non-Newtonian pseudoplastic properties to aqueous systems. More particularly, the present invention relates to the formation of water-based drilling fluids containing the subject material and to methods of using such fluids in the drilling of subterranean soil.

In normal well drilling operations in which a well is drilled by a rotary method, the well bore hole is generally filled with a drilling fluid or mud which is circulated therein. Drilling fluids are usually pumped down through the drill stem of the rotary rig, circulated around the drill bit and returned to the surface through the annular passage between the drill stem and well casing. These drilling fluids perform a number of functions including lubricating the drill stem and bit, cooling the bit, carrying the cuttings from the bit up the bore hole to the surface where the cuttings may be separated and disposed of, and providing a hydrostatic head against the walls of the well to contain downhole geopressure.

A primary requisite of a satisfactory drilling fluid is its ability to readily circulate and flow, that is, to have low viscosity, under the high sheer conditions which are present in the environs of the drill bit while, at the same time, being capable of having and maintaining sufficient viscosity to be capable of efficiently carrying the bit cuttings to the surface. It is highly desired that a drilling fluid be capable of exhibiting low viscosities under high shear conditions while also being capable of exhibiting comparatively high viscosities and carrying power under varying low shear conditions which are exerted in the annular passage between the drill stem and the well casing during the fluid's upward flow movement. In generic terms, the drilling fluid must exhibit non-Newtonian properties as a pseudoplastic fluid, especially under varying low shear rates such as are encountered in the annular passage.

The drilling fluid must also be capable of exhibiting the above-described pseudoplastic properties under changing conditions encountered during the drilling operation due to the fact that the bore hole traverses various strata such as shales, clay, etc., and the cuttings of these materials become dispersed in the fluid media. The drilling fluid components should be substantially stable to the presence of various calcium compounds and to sodium chloride which may be present in the fluid from the soil strata with which it is in contact and/or due to the use of salt water having calcium or sodium salts therein to form the drilling fluid.

It is also well known that as the bore hole increases in depth the temperatures encountered substantially increase above that found at the earth's surface. This is especially a problem found in drilling of depths greater than about 9,000 feet as is presently becoming a more common practice. Further, heat is generated by frictional forces on the drill bit. It is, therefore, preferred that components used in forming drilling fluids be stable with respect to varying elevated temperature conditions.

The drilling fluid must be capable of lifting and removing the cuttings out of the hole on its upward circulation. During this upward circulation, the drilling fluid undergoes varying low shear rates and must have and maintain a substantial viscosity in order to effectively remove the cutting materials. The more rapidly these materials are removed without the necessity of further grinding and pulverizing to a fine particle size by the drill bit, the more efficiently the drill is permitted to act upon new subterranean soil.

A wide variety of drilling fluids have been used, including aqueous-based liquids, hydrocarbon based liquids, air and other gases, mist, foams and the like. Since great volumes of drilling fluids are required for the purposes of providing a cooling medium for the rotary bed and a means of carrying off the drilled particles, most of the conventional fluids used have been based on water. Water alone being a Newtonian fluid, does not have the needed capability to efficiently carry the drilled particles from the bore hole to the surface. This becomes increasingly apparent as the bore hole increases in depth.

It is a widely held and accepted theory that the viscosities suitable for creating a particle carrying capacity in the fluid can be achieved with the drilling fluid having pseudoplastic properties, that is, that the viscosity must be sufficient to prevent the drilled particles from separating from the drilling fluid when the agitation of the fluid has diminished. For example, the drilling fluid must be capable of having a low viscosity under the high shear rates at the drill bit yet have the ability to increase in viscosity (and, therefore, particle holding power) under decreasing shear rates encountered in its upward movement through the bore casing.

In order to obtain the requisite pseudoplastic properties, it has been thought desirable to use clay or colloidal clay bodies such as bentonite. As a result, the drilling fluids have been usually referred to as "muds." The use of clay based drilling fluids has provided the means of initially meeting the two basic requirements of drilling fluids, i.e., cooling and particle removal. However, the clay-based drilling fluids are highly unstable when they come in contact with various salts found in drilled earth formations.

Materials which have come into expanding use as components of drilling compositions are Xanthan gums such as are discribed in U.S. Pat. Nos. 3,198,268; 3,208,526; 3,251,147; 3,243,000; 3,307,016 and 3,319,715. These materials have been found to cause aqueous solutions, such as drilling fluids, to exhibit pseudoplastic properties under varying low shear forces. However, these materials, whether used alone or in combination with other additives, present the problem of being irreversibly degraded by the elevated temperatures often encountered during conventional drilling operations and thereby require continuous supplementation of material. The high cost of the Xanthan gums, and the high rate of degradation, limit their usefulness to specialized operations.

There is a general need for a drilling viscosifier which is capable of being produced at low cost and which renders an aqueous drilling fluid pseudoplastic so as to permit ease of fluidity under high shear conditions such as found at the drill bit site, while being capable of acting as an efficient carrier and remover of drilled particles.

SUMMARY OF THE INVENTION

It is an object of the present invention to form a reaction product which is a useful viscosifier for aqueous based systems. Further, it is an object of the present invention to form water-based fluids useful for drilling bore holes and the like which contain the subject reaction product to render the fluid capable of exhibiting non-Newtonian or pseudoplastic properties so as to be capable of efficiently carrying away drill bit cuttings. Still further, it is the object of the present invention to form a drilling fluid which is substantially stable to varying environmental conditions of temperature and salt content normally encountered in bore hole drilling.

The present invention is directed to silane-modified inorganic compositions, drilling fluids containing said compositions and methods of drilling bore holes and the like with said drilling fluid wherein said composition is a reaction product, formed in an aqueous medium, of a hydrogel of an oxide selected from silicon oxide, aluminum oxide or mixtures thereof with from about 0.01 to 0.3 mole per mole of oxide of a silane represented by the formula $R_xSiR'_{4-x}$, wherein R represents a $C_1-C_{20}$ hydrocarbon radical, R' represents an alkoxy or halogen radical and x is an integer of from 1 to 3.

DETAILED DESCRIPTION OF THE INVENTION

The present invention is directed to the formation of certain inorganic polymer products, the utilization of these products as a viscosifier for water-base systems and, in particular, as an essential component in a drilling fluid composition to cause the composition to exhibit pseudoplastic properties, and to methods of drilling bore holes into the earth by utilizing the subject drilling fluid composition. Specifically, the subject invention is directed to an organosilane-modified silica, alumina or, silica-alumina inorganic viscosifying material.

The inorganic polymer products of the subject invention can be formed from any water soluble precursor or compound which is capable of forming a hydrogel of silicon oxide or aluminum oxide or mixtures thereof in situ in an aqueous solution as described hereinbelow.

With respect to the formation of silicon oxide hydrogels, suitable water-soluble precursors of silicon oxide which have been found useful in the subject invention include alkali metal silicates, and ammonium silicates. A wide range of silicates which are suitable include, for example, sodium silicate, potassium silicate, ammonium silicate and the like with sodium silicate and potassium silicate being preferred. The ratio of the silicon oxide to alkali metal oxide of the silicate precursor can vary from about 1 to about 4. It is preferable to utilize a commercially available sodium silicate solution or waterglass solution, as it is conventionally known.

In a similar manner to the silicon oxide described hereinabove, the water soluble aluminum agents which are suitable in forming reaction products of the present invention are any water soluble precursor agent which is capable of forming aluminum oxide hydrogel in situ in an aqueous solution. For example, alkali metal aluminates such as sodium aluminate, potassium aluminate, and the like, are suitable agents which can be readily used in forming the polymeric hydrogel of the subject invention. The sodium and potassium aluminates are preferred. In addition, other aluminum salt compounds, such as aluminum sulfate, aluminum chloride, aluminum nitrate and the like which are readily converted to the oxide can be utilized in accordance with the present invention.

Further, mixed silicon oxide-aluminum oxide polymeric hydrogels can be used in forming the present compositions. These hydrogels can be formed by the conversion of mixtures of the above-described precursor agents in known manners to form hydrogels in which the ratios of silicon oxide to aluminum oxide to be from about 99:1 to 1:99, with ratios ranging from about 95:5 to 5:95 being preferred.

The silane-modified inorganic reaction products of the present invention are formed by initially producing an inorganic hydrogel of the oxide or mixed oxide and contacting the oxide prior to complete gelation and under a high degree of mixing with from about 0.01 to 0.3 mole of a silane compound. The resultant product can be directly diluted to desired concentrations to form an aqueous base having the desired pseudoplastic properties or can be concentrated or dried to a solid product which can be reconstituted with water at a subsequent time.

The inorganic hydrogel used in forming the silanemodified inorganic reaction products of the present invention can be formed in known manners by the partial neutralization and hydrolysis of a silicon oxide and/or aluminum oxide precursor agent. For example, an alkali metal silicate hydrosol such as sodium or potassium silicate hydrosol, can be formed into a silica hydrogel in known manners by the introduction of a mineral acid, such as hydrochloric acid, sulfuric acid, nitric acid and the like, in sufficient amounts to lower the pH to below about 10 to cause the formation of the hydrogel therefrom. Although the amount of acid used is not critical, it is preferred to use only a sufficient amount to maintain an alkaline system and preferably a pH of greater than about 9.

In a similar manner to the formation of the silica hydrogel described hereinabove, alumina hydrogels can be formed by contacting an aluminate solution, such as a sodium aluminate hydrosol, with a sufficient amount of a mineral acid, such as sulfuric, hydrochloric, nitric acid and the like, to form a hydrogel therefrom. The amount of acid should normally be sufficient to reduce the pH of the hydrosol to below about 10 to cause the formation of the hydrogel. Greater amounts of acid can be used, although it is preferred to have the resultant gel alkaline and most preferably above a pH of about 9.

Due to the amphoteric nature of aluminum, acidic aluminum compounds which are capable of forming oxide hydrogels, such as aluminum sulfate, require the utilization of a sufficient amount of a base, such as an alkali metal hydroxide, an alkaline earth metal hydroxide or ammonium hydroxide, to form the desired aluminum oxide hydrogel.

The initial solution should contain an effective amount, such as from about 5 to 50 percent by weight, of a precursor agent or mixtures discussed above to form the polymeric oxide hydrogel. A sufficient amount of a neutralizing agent to cause the resultant solution to have a pH of from about 7 to 11, and preferably alkaline, is used to form the hydrogel material.

The silane-modified inorganic compositions of the present invention can be formed from a mixed aluminum oxide-silicon oxide polymer material. These materials can be formed by the partial neutralization of a mixture of silica oxide and aluminum oxide precursors, such as by the partial neutralization of an alkali metal silicate-alkali metal aluminate solution or by the coaction of an alkali metal silicate solution with an acidic aluminum compound, as described above. The polymeric silicon oxide and aluminum oxide are formed in situ to produce a polymeric hydrogel of mixed oxide material, which, prior to complete gelation, is contacted with a silane compound as described hereinbelow.

The silanes found useful in forming the modified inorganic material of the present invention are represented by the formula $R_xSiR'_{4-x}$ in which R represents a $C_1$ to $C_{20}$ and preferably a $C_1$ to $C_6$ hydrocarbon radical; R' represents an alkoxy or halo radical; and x is an integer of from 1 to 3 and preferably 1 to 2. For example, the symbol R can represent an alkyl radical such as methyl, ethyl, vinyl, propyl, methylvinyl, butyl, pentyl, hexyl, decyl, octadecyl, nonadecyl and the like; a cycloalkyl radical such as cyclohexyl, cyclopentyl and the like; an aryl radical such a phenyl, toluyl and the like. R' can represent a bromo, chloro, iodo and the like halo radical, with chloro being preferred; further, R' can represent an alkoxy radical represented by OR" in which R" is the same as R described hereinabove and most preferably a $C_1$ to $C_3$ alkyl or a phenyl radical. Examples of silanes which are useful in forming the reaction product of the present invention and in forming drilling fluid compositions as disclosed herein include alkylhalosilanes such as methyltrichlorosilane, dimethyldichlorosilane, trimethylchlorosilane, ethyltrichlorosilane, diethyldichlorosilane, triethylchlorosilane, trichlorovinylsilane, i-propyltrichlorosilane, octadecyltrichlorosilane, and the like; arylhalosilane such as triphenylchlorosilane, diphenyldichlorosilane, phenyltrichlorosilane and the like; alkylalkoxysilanes such as trimethoxymethylsilane, trimethoxyethylsilane, dimethoxydimethylsilane, dimethoxydiethylsilane, diethoxydimethylsilane, diethoxydiethylsilane, trimethylmethoxysilane, triethylethoxysilane and the like, and arylalkoxysilanes such as phenyltriethoxysilane, diphenyldiethoxysilane, triphenylethoxysilane, and the like.

The silane material should be free of any reactive constituents on the hydrocarbon moiety in order to further stabilize the formed polymeric viscosifying agent.

In order to obtain the desired products of the present invention, the silane should be used in certain specific quantities with respect to the inorganic oxide. The amount of silane employed should be from about 0.01 to 0.3, and preferably from 0.01 to 0.2, mole of silane per mole of oxide. Reaction products formed with high molar ratios of silane to inorganic oxide do not normally exhibit the desired properties. The silane is to be added prior to complete formation of the hydrogel and, therefore, normally within about 30 minutes after initiation of the hydrogel formation. It is preferable to add the silane to the aqueous precursor containing solution substantially simultaneously with or within a short period of time, such as about 10 minutes, after initiation of the hydrogel formation. Further, the silane and inorganic oxide forming material should be contacted under a high degree of mixing and at a temperature of from about ambient to about 75° C.

It is most preferred that the silane modified inorganic product of the present invention be formed from a silane compound as described hereinabove which contains two or three alkoxy or halo groups therein. The silane should be added as soon as possible after initiation of the hydrogel. The amount of silane should be from 0.01 to 0.15 moles of silane per mole of oxide and should vary directly with increase in temperature of the reaction medium.

Although the exact reaction of the silane and the inorganic material is not known, it is believed that the silane, when contacted with the above-described inorganic oxide in the presently prescribed manner and amounts, causes a certain degree of disorientation of the inorganic oxide lattice while forming therein unhydrolyzable silicon to carbon bonds to produce the resultant material to unexpectedly exhibit non-Newtonian pseudoplastic properties as discussed hereinbelow.

The above described silane modified inorganic materials are capable of causing an aqueous solution (the term "solution" when used with respect to the silane-modified inorganic reaction product refers to a solution, suspension or dispersion of the product) to exhibit non-Newtonian, pseudoplastic rheological properties, that is to say, that the viscosity of the resultant aqueous solution varies inversely with respect to the shear rate exerted on the system. The relationship of the shear stress with respect to shear rate can be defined by the rheological power law model relationship of $$\tau = K(\dot{\gamma})^n$$

in which $\xi$ represents the shear stress of the aqueous system in units such as pounds per 100 ft$^2$ or dynes/cm$^2$; $\dot{\gamma}$ is the shear rate in units of time such as sec$^{-1}$; K is a constant having the value of the shear stress of the solution at a shear rate of 1 sec$^{-1}$ and n is a numerical value of from 0 to 1. It has been unexpectedly found that aqueous systems containing the presently described silane modified inorganic oxides exhibit shear stress ($\tau$) properties at varying shear rates ($\dot{\gamma}$) in the range of from about 10 to 500 sec$^{-1}$, that is, in the range normally encountered in the annular region of the bore hole, such that n of the power law relationship has a value of less than 0.6. Such systems, therefore, exhibit non-Newtonian pseudoplastic properties to a desirable degree. It has been further unexpectedly found that when an aqueous system contains a reaction product formed in accordance to the preferred conditions described hereinabove, one can obtain an aqueous system which exhibits rheological properties such that n has a value of about 0.4 or less. Such systems exhibit an exceptionally high degree of non-Newtonian properties.

FIG. 1 is a typical graphic presentation of the shear stress at varying shear rates which are obtained from aqueous solutions containing the presently disclosed product. When plotting log shear stress versus log shear rate with log shear stress being plotted on the abscissa and log shear rate on ordinate of the graph, the desired properties are readily apparent. At low shear rates, such as from about 10 to about 500 sec$^{-1}$, as are encountered in the annular region of the bore hole, the shear stress should increase at a low rate with respect to the shear rate exerted on the material which is observed as a low slope (or n value according to the power law relationship) of the curve in this region. At high shear rates, such as are found in the region of a drill bit in a drilling operation, the fluid should have a low viscosity, that is, approach a Newtonian liquid as can be seen by an increased slope of the curve. The value for K in the power law model relationship is the shear stress value determined or extrapolated for a shear rate of 1 sec$^{-1}$.

The resultant products of the present invention can be readily suspended or dispersed in water base solutions. The resultant products, when used in an aqueous system in concentrations ranging from about 1 to about 10 percent, and preferably from about 3 to 6 percent by weight based on the weight of water, exhibit desired pseudoplastic properties. The reaction products of the present invention are useful additives to water base systems which contain other additives, such as pigments, where such properties are desired.

It has been further unexpectedly found that the silane modified inorganic reaction products formed according to the present invention from aluminum oxide or mixed silicon oxide-aluminum oxide yield aqueous systems which, as well as having the unexpectedly achieved pseudoplastic properties, have excellent stability to temperature, calcium and sodium salts and various other conditions desired of a fluid used in rotary drilling of bore holes and the like. Therefore, an additional embodiment of the subject invention is the formation of drilling fluids and their utilization in the drilling of bore holes and the like, wherein the drilling fluid contents a reaction product described hereinabove and most preferably a reaction product formed from a hydrous aluminum oxide or mixed silicon-aluminum oxide hydrogel with from about 0.01 to about 0.3 and, preferably from 0.01 to 0.15 mole per mole of inorganic oxide of an organosilane represented by the general formula $R_xSiR'_{4-x}$ as described hereinabove.

The drilling fluids containing the subject silane-modified aluminum oxide or mixed silicon-aluminum oxide hydrogels have unexpectedly been found to have high degrees of stability with respect to their rheological properties under various adverse conditions. Such fluids have been found to be stable after subjection to elevated temperatures for sustained periods of time, to high shear rates such as are encountered at the site of the drill bit, as well as being stable in the presence of various corrosive elements such as calcium chloride, calcium oxide and sodium chloride entrained in such fluids.

The high degree and breadth of stability of the presently achieved drilling fluid, when combined with its ability to exhibit non-Newtonian pseudoplastic properties under varying low shear rates of from about 10 to 500 sec$^{-1}$ and greater, such as are encountered in the annular region between the drill stem and the casing of the bore hole, aids in increasing the drilling efficiency, that is, the rate of drilling the bore hole. Drilling fluids having concentrations of from about 1 to about 8 percent active solids (oxide plus silane) yield fluid systems which unexpectedly have the desired properties.

The drilling fluid composition of the subject invention can contain other conventional drilling fluid additives such as water loss inhibitors as, for example, polyanionic cellulose and the like; wetting agents such as lignosulfonate metal salts and the weighting agents as, for example, crushed oyster shells, barite, hematite, magnetite and the like; as well as other components conventionally used in this art.

The terms "water-base system", "water-containing system" and the like, which are used herein in describing the present invention, generally include systems and drilling fluids which have a liquid base comprising substantially fresh water or salt water. However, it is to be realized that at times certain small amounts of other liquids may be emulsified or admixed with the water-based system. For example, drilling fluids may at times contain small amounts of oil, emulsified or admixed with the drilling fluid, the oil coming either from an oil formation drilled into or, under certain conditions, can be purposely added.

The silane modified inorganic reaction products of the present invention, and in particular the silane-modified aluminum oxide or silicon-aluminum mixed oxide materials, can be added to aqueous drilling fluid by any conventional means such as by the addition of solid material which has been formed by previously drying the aqueous solution in which the subject reaction product is formed. This drying can be accomplished by various known drying means such as by spray drying of an aqueous solution containing the desired material utilizing conventional spray drying techniques and apparatus. Alternatively, the aqueous solutions of silane-modified inorganic reaction product can be formed into concentrated solution by conventional evaporation techniques. Such concentrated solutions can be subsequently diluted or added to previously formed water-based fluid systems to cause the resultant systems to have a desired concentration of active solids (i.e., oxide plus silane). The concentrated solution can be added to the drilling fluid by means of conventional metering pumps and the like. In all other respects, the drilling procedures will be carried out in conventional manners known to those skilled in this art.

The drilling fluids should have an alkaline pH which can be adjusted by the addition of sufficient base to the solution. Further, the amount of acid used in forming the inorganic hydrogels from basic materials, such as alkali metal aluminates, alkali metal silicates, can be adjusted so as to lower the pH only sufficiently to cause the formation of hydrogel that is to about a pH of 10 to 10.5. The final aqueous solution should be adjusted to have a pH of from about 9.0 to 11, with from about 9.5 to 10.5 being preferred.

The following examples are given for illustrative purposes only and are not meant to limit the invention except as defined by the claims set forth hereinbelow. All parts and percentages are by weight except where otherwise indicated.

EXAMPLE I 180 ml. of a 40 percent aqueous sodium silicate solution $Na_2O:SiO_2=1:3.2$) was diluted with 820 ml. of water to form a stock sodium silicate solution. To 250 parts of the formed silicate solution was added 41 parts of 2.4 N sulfuric acid aqueous solution. The resultant mixture was allowed to initiate gellation for about 30 minutes and then was vigorously stirred while adding 1.4 parts (silane: $SiO_2=1:25$) of commercially obtained diethoxydimethylsilane (d=0.865). A 150 part sample of the aqueous solution of the resultant reaction product was mixed with 400 parts of water (active solid content=1.8 percent). The resultant sample was tested for its rheological properties using a standard procedure with a Haake Rotovisco rotating viscometer (Model RV-1) at varying shear rates and at 25° C. The values of n and K (given as pounds-sec/100 ft$^2$ in all examples) in the power law model relationship were determined to be 0.32 and 1.5 respectively. The aqueous solution containing the silane-modified silicon oxide reaction product exhibited excellent pseudoplastic properties.

EXAMPLE II

For comparative purposes, a silane modified silicon oxide hydrogel was formed under the same conditions as in Example I except that the hydrogel was allowed to form for several hours prior to the addition of silane. 80 parts of the resultant product was thoroughly mixed with 200 parts water (active solid concentration=1.25 percent) and was determined to have a value for n and K of 0.66 and 0.17 respectively. Another sample formed from an additional 80 parts of the resultant product with 160 parts water (active solid concentration=1.45 percent) had an n and K value of 0.67 and 0.17 respectively. These samples exhibited poor pseudoplastic properties.

EXAMPLE III

For comparative purposes an unmodified silica hydrogel was formed and tested by taking 250 parts of the stock sodium silicate solution of Example I above and mixing it with 43 parts of 2.4 N aqueous sulfuric acid solution. The resultant mixture was gelled in 40 minutes. An 80 part portion of the silica hydrogel was thoroughly mixed with 200 parts water and tested for rheological properties according to the procedure of Example I. A value for n in the power law model relationship was 0.93. An additional 80 part portion of the hydrogel was mixed with 100 parts water and similarly tested. The resultant n value was 0.93.

These samples are indicative of the substantially Newtonian properties exhibited by unmodified silica gels. The material was highly sensitive to changes in shear rate and, therefore, would not be highly effective in forming a pseudoplastic composition.

EXAMPLE IV

A 5 percent aqueous solution of sodium aluminate ($Na_2O:Al_2O_3$ ratio=1:1) was formed with distilled water. 450 parts of the aluminate solution were mixed with 250 parts 1 N nitric acid. The resultant mixture had a pH of 7. 250 parts of the thickening syrup was then reacted with 0.89 part diethoxydimethylsilane (DEDMS) under vigorous agitation. 82 parts of the resultant silane-modified alumina gel were thoroughly mixed with 100 parts water (resultant concentration $AlO_{1.5}$=1.44 percent; DEDMS=0.16 percent) and its rheological properties determined under varying shear stress. The values of n and K were 0.48 and 0.49 respectively.

EXAMPLE V 200 parts of 20 percent $Al_2(SO_4)_3$ aqueous solution was mixed with 179 parts of 1 N $NH_4OH$. The mixture had a pH of 7.5. To 150 parts of the viscous syrup mixture was added 1.4 parts of DEDMS. 80 parts of the resultant silane-modified aluminum oxide reaction product were mixed thoroughly with 50 parts water ($AlO_{1.5}$ concentration=6.5 percent; DEDMS concentration=0.56 percent) and exhibited rheological properties in a relationship under the power law model relationship such that n=0.5 and K=0.28.

EXAMPLE VI 600 parts of a 5 percent $Al_2(SO_4)_3$ aqueous solution were vigorously mixed with 150 parts of 1 N $NH_4OH$ and 3 parts DEDMS added together. The resultant aqueous solution of reaction product ($AlO_{1.5}$ concentrate=4 percent; DEDMS concentrate=0.4 percent) exhibited rheological properties such that n and K of the power law model relationship were 0.35 and 2.4 respectively.

EXAMPLE VII

A silane modified silica gel was formed according to the procedure set forth in Example I above except that 0.7 parts of commercial trimethylchlorosilane (TMCS), d.=0.856, was added approximately 4 minutes after the acidification of the waterglass solution. 100 parts of the resultant silane modified reaction product were thoroughly mixed with 160 parts water (resultant $SiO_2$ concentration=1.63 percent; TMCS=0.1 percent) and had rheological properties such that n and K of the power law were determined to be 0.3 and 2.5 respectively.

EXAMPLE VIII

A silane-modified silica gel was formed according to the procedure set forth in Example I above except that acidified waterglass solution was allowed to gel for about 4 minutes and then 2.5 parts of dimethyldichlorosilane (DMDCS), d.=1.064, were added under vigorous mixing. The material formed into a thick gel within less than two minutes. 80 parts of the resultant silane-modified silica gel was thoroughly mixed with 200 parts water ($SiO_2$ concentration=1.23 percent; DMDCS concentration=0.2) and exhibited the rheological properties such that n and K of the power law relationship were 0.42 and 0.66 respectively.

EXAMPLE IX 250 parts of a stock sodium silicate solution formed in the same manner as described in Example I above was mixed with 50 parts 2.4 N $H_2SO_4$ solution. The sample was allowed to stand several minutes until gelation began and then, under vigorous agitation, was treated with 2 parts octadecyltrichlorosilane (ODTCS), d.=0.984. A 50 part sample of the silane-modified reaction product was diluted with 130 parts water ($SiO_2$ concentration=1.14 percent; ODTCS concentration=0.18 percent) and the rheological properties were determined. The n and K values according to the power law relationship were 0.23 and 1.9, respectively.

EXAMPLE X

A silane modified silicon oxide composition was prepared in the same manner as described in Example IX above except that 0.9 parts triethoxyvinylsilane (TEVS), d.=0.903, was used instead of ODTCS. The tested sample had an active solid concentration of $SiO_2$=1.14 percent and of TEVS=0.09 percent. The n and K values were determined from the rheological tests to be 0.45 and 0.57, respectively.

EXAMPLE XI

A silane-modified silicon oxide reaction product composition was prepared in the same manner as in Example IX except that 1.2 parts dichlorodiphenylsilane (DCDPS), d.=1.204, was used as the silane. The concentration of $SiO_2$ was 1.14 percent and of DCDPS was 0.09 percent in the tested samples. The rheological tests gave an n of 0.42 and K of 0.9.

EXAMPLE XII 250 parts of a sodium silicate aqueous solution containing 5 percent $SiO_2$ was mixed, under vigorous stirring, with 43 parts of a 1 N $Al_2(SO_4)_3.16 H_2O$ aqueous solution. After the solution started to become syrupy (about 5 minutes) 2.77 parts of DEDMS were added. 80 parts of the resultant silane-modified silicon/aluminum mixed oxide composition were diluted with 40 parts water and tested for rheological properties in the same manner as discussed in Example I above. The n and K values according to the power law model relationship were determined to be 0.27 and 2.8 respectively.

The composition was allowed to age for 30 days at ambient temperature. Rheological properties were again determined and the n and K values were calculated to be 0.31 and 1.7 respectively.

Thermal Stability: The test composition was placed in a sealed bomb, purged with $N_2$ and subjected to 250 degrees F for 16 hours while under constant agitation in a roller oven. The sample was then cooled to ambient temperature and shear stress determinations were made at varying shear rate using the Haake Rotovisco rotating viscometer. The n and K values were 0.31 and 1.7 respectively, showing that the gel was substantially heat stable.

NaCl Tolerance: Reagent grade NaCl was introduced into a sample so as to have a concentration of 35,000 ppm NaCl therein. The sample was allowed to stand for about 24 hours and then shear stress at varying shear rates was determined. The n and K values were 0.30 and 1.7 respectively, showing that the silane-modified silicon-aluminum oxide composition was stable and exhibited pseudoplastic properties in the presence of sodium chloride.

$Ca^{++}$ Tolerance: A sample was salted with $CaCl_2$ to a 5 percent level. The sample was allowed to stand for about 24 hours and then subjected to rheological tests to determine shear stress vs. shear rate. The n and K values were 0.28 and 1.6 respectively. Again the material is stable and retains its pseudoplastic properties.

EXAMPLE XII A

For comparative purposes, 0.5 part of a commercially available Xanthan gum (Kelzan XC) commonly used as a drilling mud viscosifier was uniformly mixed at high shear with 99.5 parts deionized water. A sample was tested at varying shear rates on the Haake viscometer as described in Example I above. The n and K values were determined to be 0.32 and 4.4 respectively. The sample was subjected to 250 degrees F for 16 hours in a rotating sealed bomb which had been purged with $N_2$ as described in Example XII above, allowed to cool to ambient temperature and then its rheological properties were retested. The value for n was 1.0. The increase in n to unity indicates that the Xanthan gum was unstable to elevated temperatures and the fluid was Newtonian even at varying low shear rates.

EXAMPLE XIII

Several samples of silane-modified silica/alumina compositions were formed by high speed mixing of 268 parts of a sodium silicate solution having 6.12 percent $SiO_2$ and 2.2 percent $Na_2O$ with 49.5 parts of a 21 percent $Al_2(SO_4)_3.16\ H_2O$. 2.77 parts of DEDMS were added to each sample at different time intervals. 80 parts of the resultant compositions were each thoroughly mixed with 42 parts of water. The values of n and K were determined for each sample and is shown in Table I below.

TABLE I

| Sample | Time of Addition of DEDMS | n | K |
|---|---|---|---|
| (A) | Added with silicate | 0.22 | 2.99 |
| (B) | Added 2 min. after silicate - $Al_2(SO_4)_3$ mixed | 0.25 | 5.2 |
| (C) | Added about 4 min. after silicate - $Al_2(SO_4)_3$ mixed | 0.30 | 2.08 |
| (D) | Added 6 min. after silicate - $Al_2(SO_4)_3$ mixed | 0.32 | 2.58 |

EXAMPLE XIV

Several silane modified silica/alumina compositions were formed under varying conditions. In each instance 268 parts of sodium silicate aqueous solution (6.12 percent $SiO_2$; 2.2 $Na_2O$) was used. The $AlO_{1.5}/SiO_2$ mole ratio in the resultant product was varied between 0.12, by using 49.5 parts of 21 percent $Al_2(SO_4)_3.16\ H_2O$ aqueous solution, to the ratio of 0.02, by using 8.25 parts of the same aluminum sulfate, with 41.25 parts of 2.2 N $H_2SO_4$. The silane was either added as part of the sodium silicate or about 5 minutes after the initial mixing of silicate and aluminum sulfate solutions. The amount of active functional groups of the silane and the ratio of silane to silica was varied by using trimethylethoxysilane in 4.85 part or 0.32 part or methyltriethoxysilane in 7.31 parts or 0.49 part. Further, the severity of agitation was varied by using a high speed blender or an electric stirrer. The pH of the resultant composition was between 9.3 to 10.1. The samples were diluted with water to have the indicated solid content.

TABLE I

| Run No. | Cap/SiO$_2$ Ratio | AlO$_{1.5}$SiO$_2$ Ratio | Functionality | Agitation | Temp deg. C. | Add Cap. | % Active Solids | "n" | "K" |
|---|---|---|---|---|---|---|---|---|---|
| 1 | .15 | .12 | 3 | low | 25 | with | 4 | 0.41 | 2.5 |
| 2 | .15 | .02 | 3 | high | 70 | after | 5 | 0.43 | 1.4 |
| 3 | .15 | .02 | 1 | low | 70 | with | 5 | 0.38 | 1.6 |
| 4 | .01 | .02 | 4 | low | 25 | with | 4 | 0.45 | 0.58 |
| 5 | .01 | .12 | 3 | high | 70 | after | 5 | 0.30 | 2.6 |
| 6 | .01 | .02 | 1 | high | 25 | with | 4 | 0.56 | 2.0 |
| 7 | .01 | .12 | 1 | high | 70 | with | 5 | 0.47 | 2.2 |
| 8 | .01 | .12 | 3 | low | 25 | after | 5 | 0.39 | 4.4 |
| 9 | .01 | .12 | 3 | low | 25 | after | 5 | 0.48 | 2.5 |
| 10 | .15 | .02 | 3 | low | 70 | with | 5 | 0.50 | 1.9 |
| 11 | .15 | .12 | 3 | high | 25 | after | 5 | 0.44 | 2.9 |
| 12 | .15 | .02 | 3 | low | 25 | after | 5 | 0.29 | 3.70 |
| 13 | .01 | .02 | 1 | high | 25 | with | 4 | 0.38 | 5.30 |
| 14 | .15 | .02 | 3 | high | 25 | with | 4 | 0.40 | 2.58 |
| 15 | .01 | .02 | 3 | high | 70 | with | 5 | 0.57 | 2.10 |
| 16 | .01 | .12 | 3 | high | 25 | with | 4 | 0.45 | 3.40 |
| 17 | .01 | .12 | 1 | low | 25 | with | 5 | 0.39 | 3.20 |

EXAMPLE XV

Samples of silane-modified viscosifiers were formed from 1593 parts of a 19.1 percent solution of sodium aluminate by initially adding 2932 parts of 1 N HCl and then 36.3 parts of commercially obtained diethoxydimethylsilane. The resultant product had silane to aluminum mole ratio of 0.085 and a pH of 9.7. Similarly, a sample of diethoxydimethylsilane modified aluminum-silicon mixed oxides hydrogel was formed according to the procedure given in Example XIII-C. The resultant product was diluted 5:1 with deionized water.

Samples were formed using 90 parts of each of the materials, with and without the addition of 10 parts of CaO to simulate conditions associated with drilling through earthen cement plugs. The rheology of the samples was determined and according to the power law model relationship the following walues were obtained.

|  | Without CaO | | With Cao | |
|---|---|---|---|---|
|  | n | K | n | K |
| Silane Modified - $Al_2O_3$ | 0.25 | 3.4 | 0.09 | 10.8 |
| Silane Modified - $Al_2O_3$—$SiO_2$ | 0.21 | 3.6 | 0.27 | 4.0(a) |

(a)sample appreciably thickened after 24 hours.

In comparison, it is well known in the art that aqueous systems containing Xanthan gum will loose their desirable properties when contacted with calcium oxide.

EXAMPLE XVI

In order to exemplify the formation of drilling fluids with the presently described viscosifiers in combination with some water loss control agents commonly used, the following samples were formed:

A sample of silane-modified aluminum oxide hydrogel and a silane modified aluminum-silicon mixed oxide hydrogel were formed in the same manner as described in Example XV above. The samples were diluted with water to give an initial K value of about 3–10. Portions of the formed silane-modified mixed oxide were then mixed with 1 percent of polyanionic cellulose (sold under the tradename "DRISPAC"). In addition a portion of the silane modified silica alumina was mixed with 1 percent of a pregelatinized starch (sold under the tradename "MY-LO-GEL"). The rheological properties of each of the samples were determined. The liquid loss properties of the samples were determined by placing the sample in a vessel having a standard Baroid filter (3.5 in. diameter) at an outlet port and subjecting the sample to 100 psi pressure for 30 minutes while measuring the liquid exuded. The results are given below:

| Sample | n | K | liq. Loss cc/ 30 min. |
|---|---|---|---|
| Silane mod. $Al_2O_3$—$SiO_2$ + DRISPAC | 0.28 | 76 | 18.6 |
| Silane Mod. $Al_2O_3$—$SiO_2$ + MY-LO-GEL | 0.49 | 0.64 | 12.4 |
| Silane Mod. $Al_2O_3$ + DRISPAC | 0.33 | 16.0 | 15.0 |

EXAMPLE XVII

In order to show high level tolerances to calcium and sodium salts, a silane modified aluminum-silicon mixed oxide hydrogel product was formed in the same manner as described in Example XV above. 5 parts of the sample were diluted with 1 part of water (active solid = about 5 percent). The pH of the sample was 10.2. The sample was divided into three parts; to one part was added 5 percent calcium chloride, to another part was added 10 percent sodium chloride and the third part was run as a standard. The resultant samples were rheologically tested in the same manner as above described using a Haake Rotovisco RV-I viscometer. The n and K values are given below and show a high degree of tolerance to high salt concentrations:

| Additive | n | K |
|---|---|---|
| None | 0.22 | 3.0 |
| 5% $CaCl_2$ | 0.14 | 11.2 |
| 10% NaCl | 0.16 | 5.5 |

EXAMPLE XVIII

A sample of silane modified aluminum oxide hydrogel reaction product was formed by initially partially neutralizing 228 parts of a 19.1 percent solution of sodium aluminate ($Na_2O$:$Al_2O_3$ mole ratio =1) (diluted with 66 parts of water) with 351 parts of 1 N HCl. The mixture was allowed to stand for about 1 minute to permit initial thickening of the hydrogel. 4.4 parts of commercially obtained dichlorodimethylsilane, d. =1.064 (molar ratio of silane to aluminum oxide ($AlO_{1.5}$)=0.0846) was introduced into the forming hydrogel under rapid mixing. 7 parts of the resultant product were diluted with 3 parts of deionized water to give a resultant aqueous composition having 4.2 percent active solids and a pH of 9.7. The rheological and stability properties of the composition were tested. The results are indicated in the table hereinbelow.

TABLE III

| Initial | | Thermal | | $CaCl_2$ (0.5%) | | $CaCl_2$ (5%) | | NaCl (3.5%) | | NaCl (10%) | |
|---|---|---|---|---|---|---|---|---|---|---|---|
| n | K | n | K | n | K | n | K | n | K | n | K |
| 0.22 | 4.3 | 0.19 | 11.4 | 0.23 | 2.65 | 0.28 | 1.68 | 0.20 | 3.26 | 0.31 | 1.70 |

Further, each of the salted samples was subjected to thermal treatment of 250 degrees F for 16 hours and then retested. The results are given below.

| | | Thermally Treated Samples | | | | | | | |
|---|---|---|---|---|---|---|---|---|---|
| no salt | | $CaCl_2$ (0.5%) | | $CaCl_2$ (5%) | | NaCl (3.5%) | | NaCl (10%) | |
| n | K | n | K | n | K | n | K | n | K |
| 0.19 | 11.4 | 0.20 | 16.3 | 0.17 | 15.2 | 0.23 | 11.1 | 0.28 | 13.8 |

The above data shows that the silane-modified aluminum oxide hydrogels have excellent rheology and thermal stability, alone, as well as in the presence of both low and high levels of Ca ions and NaCl and, therefore, would not readily degrade from the elements normally encountered in bore hole drilling operations.

In comparison, an 0.5 percent aqueous solution of a Xanthan gum (Kelzan XC) commonly used as a drilling fluid viscosifier was tested under the same conditions as was done above with the silane-modified aluminum oxide reaction product solutions, the results clearly show that this material degrades, that is, becomes a Newtonian fluid, upon subjection to elevated temperatures.

TABLE IV

| | n | K | After Thermal Aging | |
|---|---|---|---|---|
| | | | n | K |
| Xanthan gum | 0.23 | 8.7 | 1.0 | 0.1 |
| Xanthan gum + 0.5% $CaCl_2$ | 0.30 | 4.05 | 1.0 | 0.1 |
| Xanthan gum + 5% $CaCl_2$ | 0.33 | 5.0 | 1.0 | 0.1 |
| Xanthum gum + 3.5% NaCl | 0.27 | 4.35 | 1.0 | 0.1 |

TABLE IV-continued

| | n | K | After Thermal Aging n | K |
|---|---|---|---|---|
| Xanthan gum + 10% NaCl | 0.31 | 3.75 | 1.0 | 0.1 |

EXAMPLE XIX

An aqueous solution of a silane modified aluminum oxide reaction product was formed in the same manner as in Example XVIII above and an additional sample of reaction product was formed in the same manner except that the amount of silane was reduced to give a mole ratio of silane to aluminum oxide of 0.042. The pH of each was 9.5. Both samples were subjected to high shear forces of about 50,000 sec.$^{-1}$ by circulating the material through a 0.032 inch I.D. capillary tube for about 30 minutes. The solutions were tested for rheology and thermal stability. The results are indicated below.

TABLE V

| Sample mole ratio Silane/AlO$_{1.5}$ | pH | n | K | After Thermal Aging pH | n | K |
|---|---|---|---|---|---|---|
| 0.0846 | 9.5 | 0.25 | 1.56 | 9.3 | 0.25 | 8.0 |
| 0.042 | 9.5 | 0.23 | 2.0 | 9.3 | 0.20 | 12.5 |

The materials showed good stability to both high shear and thermal forces.

EXAMPLE XX

A rotary drilling operation to drill a bore hole can be done in conventional manner except that the drilling mud contains as its viscosifier agent a silane-modified aluminum oxide material which is formed from dichlorodimethylsilane and a hydrous aluminum oxide. The aluminum oxide hydrogel is formed by partially neutralizing, with 1 N HCl, a sodium aluminate (Na$_2$O:Al$_2$O$_3$ mole ratio =1) solution to a pH of approximately 9.5 to form the hydrogel while simultaneously introducing the silane (silane to AlO$_{1.5}$=0.042 molar ratio) under vigorous mixing. The resultant product is spray dried.

The drilling mud can be formed by introducing the dried product to an aqueous solution and making the necessary adjustments to stabilize the active viscosifier solid content to about 4 percent. The drilling mud effectively cools the bit and removes the cuttings to cause an efficient drilling operation.

While the invention has been described in connection with certain preferred embodiments, it is not intended to limit the invention to the particular forms set forth, but, on the contrary, it is intended to cover such alternatives, modifications and equivalents as defined by the appended claims.

What is claimed is:

1. A silane-modified inorganic composition consisting essentially of a reaction product of an inorganic oxide hydrogel selected from hydrogels of silicon oxide, aluminum oxide or mixtures thereof and a silane represented by the formula R$_x$SiR'$_{4-x}$ wherein R is a C$_1$ to C$_{20}$ hydrocarbon, R$_1$ is a halo or a C$_1$-C$_{20}$ alkoxy radical and x is an integer of from 1 to 3; said reaction product formed by initiating the formation of the hydrogel by contacting an aqueous solution containing from about 5 to 50 weight percent of a water soluble hydrogel forming precursor agent selected from the group consisting of water-soluble alkali metal or ammonium silicates, water soluble alkali metal or ammonium aluminates, aluminum salts and mixtures thereof with a sufficient amount to cause formation of said hydrogel of a neutralizing agent; contacting prior to complete gelation and under a high degree of agitation, the forming hydrogel with from about 0.01 to 0.3 mole of said silane per mole of oxide; and causing the resultant aqueous hydrogel system to have an alkaline pH of at least about 9.

2. The composition of claim 1 wherein the amount of silane is from about 0.01 to 0.2 mole per mole of oxide and R is a C$_1$ to C$_6$ alkyl or aryl radical.

3. The composition of claim 1 wherein the inorganic oxide hydrogel is a silicon oxide hydrogel and the agent capable of forming said hydrogel is selected from an alkali metal silicate.

4. The composition of claim 1 wherein the inorganic oxide hydrogel is an aluminum oxide hydrogel and the agent capable of forming said hydrogel is selected from a water soluble aluminum salt, an alkali metal aluminate, ammonium aluminate or mixtures thereof.

5. The composition of claim 1 wherein the inorganic oxide hydrogel is a mixed aluminum oxide-silicon oxide hydrogel having AlO$_{1.5}$ to SiO$_2$ molar ratio of from 95:5 to 5:95.

6. The composition according to claim 1 wherein the reaction product is separated from the aqueous solution and recovered as a solid product.

7. The composition of claim 6 wherein the reaction product is separated and recovered from the aqueous solution by spray drying.

8. The composition of claim 4 wherein the aluminum oxide hydrogel is formed from an alkali metal aluminate, R is a C$_1$ to C$_3$ alkyl or a phenyl, R' is a halo or a C$_1$ to C$_3$ alkoxy, x is an integer of from 1 to 2 and the silane to AlO$_{1.5}$ molar ratio is from 0.01 to 0.2.

9. The composition of claim 4 wherein the aluminum oxide hydrogel is formed from a water soluble aluminum salt compound, R is a phenyl or a C$_1$ to C$_3$ alkyl, R' is a halo or a C$_1$ to C$_3$ alkoxy, x is an integer of from 1 to 2 and the silane to AlO$_{1.5}$ molar ratio is from 0.01 to 0.2.

10. The composition of claim 5 wherein the inorganic oxide hydrogel is formed by contacting an aqueous solution of an acidic aluminum salt with an aqueous solution of an alkali metal silicate having a silicon oxide to alkali metal oxide molar ratio of 1 to 4.

11. The composition of claim 5 wherein R is a phenyl or C$_1$ to C$_3$ alkyl, R' is a halo or a C$_1$ to C$_3$ alkoxy and x is an integer of from 1 to 2.

12. A composition comprising an aqueous solution having from 1 to 8 percent by weight active solids of the reaction product according to claim 1.

13. The composition of claim 12 wherein said aqueous solution exhibits pseudoplastic properties as defined by the power law model relationship of $$\tau = K(\dot{\gamma})^n$$

wherein $\tau$ is shear stress, $\gamma$ is shear rate, n has a value of up to 0.6 for shear rate range of from about 10 to 500 sec$^{-1}$ and K is a constant equal to shear stress at the shear rate of 1 sec$^{-1}$.

14. The composition according to claim 13 wherein the reaction product is a silane-modified silicon oxide hydrogel formed from an agent selected from an alkali metal silicate, or ammonium silicate with a silane represented by the formula R$_x$SiR'$_{4-x}$ wherein R is a C$_1$ to $C_6$ hydrocarbon radical, R' is a halo or $C_1$ to $C_6$ alkoxy radical, x is an integer of 1 to 2 and the molar ratio of silane to silicon is from 0.01 to 0.2.

15. The composition according to claim 13 wherein the agent is an alkali metal silicate, R is a $C_1$ to $C_3$ alkyl, R' is a halo or $C_1$ to $C_3$ alkoxy and the silane to silicon oxide molar ratio is from 0.01 to 0.1.

16. The composition according to claim 13 wherein the reaction product is a silane modified aluminum oxide hydrogel formed from an agent selected from alkali metal aluminates, ammonium aluminate and water soluble salts of aluminum with a silane represented by the formula $R_xSiR'_{4-x}$ wherein R' is a halo or $C_1$ to $C_6$ alkoxy, R is a $C_1$ to $C_6$ hydrocarbon radical, x is an integer of from 1 to 2 and the molar ratio of silane to $AlO_{1.5}$ is 0.01 to 0.2.

17. The composition according to claim 16 wherein the agent is selected from an alkali metal aluminate or a water soluble aluminum salt, R is a $C_1$ to $C_3$ alkyl, R' is a $C_1$ to $C_3$ alkoxy or halo and the silane to $AlO_{1.5}$ molar ratio is from 0.01 to 0.1.

18. The composition according to claim 17 wherein the agent is selected from aluminum sulfate or aluminum chloride.

19. The composition according to claim 17 wherein the agent is selected from the aluminum sulfate or an alkali metal aluminate, the silane is an alkyl silane and the pH of the resultant solution is between 9 and 11.

20. The composition according to claim 17 wherein the agent is selected from aluminum sulfate or an alkali metal aluminate, the silane is an alkyl halo silane and the pH of the resultant solution is between 9 and 11.

21. The composition according to claim 13 wherein the reaction product is a silane-modified mixed aluminum oxide-silicon oxide hydrogel formed from an aluminum agent selected from an alkali metal aluminate, ammonium aluminate or a water soluble aluminum salt with a silicon agent selected from an alkali metal silicate or ammonium silicate which are coreacted with a silane of the formula $R_xSiR'_{4-x}$ wherein R is a $C_1$ to $C_6$ hydrocarbon, R' is a halo or $C_1$ to $C_6$ alkoxy radical, x is an integer of from 1 to 2, the molar ratio of silane to $SiO_2 + AlO_{1.5}$ is from 0.01 to 0.2 and the pH of the resultant solution is between 9 and 11.

22. The composition according to claim 21 wherein the aluminum agent is an acidic aluminum salt and the silicon agent is an alkali metal silicate.

23. A water-base drilling fluid composition having as its aqueous base the aqueous composition according to claim 12.

24. A water-base drilling fluid composition having as its aqueous base the aqueous composition according to claim 13.

25. A water-base drilling fluid composition having as its aqueous base the aqueous composition according to claim 14.

26. A water-base drilling fluid composition having as its aqueous base the aqueous composition according to claim 15.

27. A water-base drilling fluid composition having as its aqueous base the aqueous composition according to claim 16.

28. A water-base drilling fluid composition having as its aqueous base the aqueous composition according to claim 17.

29. A water-base drilling fluid composition having as its aqueous base the aqueous composition according to claim 18.

30. A water-base drilling fluid composition having as its aqueous base the aqueous composition according to claim 19.

31. A water-base drilling fluid composition having as its aqueous base the aqueous composition according to claim 20.

32. A water-base drilling fluid composition having as its aqueous base the aqueous composition according to claim 21.

33. A water-base drilling fluid composition having as its aqueous base the aqueous composition according to claim 22.

34. In a process for drilling a bore hole with borehole drilling tools wherein there is circulated in the bore hole a water-base drilling fluid according to claim 23.

35. In a process for drilling a bore hole with borehole drilling tools wherein there is circulated in the bore hole a water-base drilling fluid according to claim 24.

36. In a process for drilling a bore hole with borehole drilling tools wherein there is circulated in the bore hole a water-base drilling fluid according to claim 25.

37. In a process for drilling a bore hole with borehole drilling tools wherein there is circulated in the bore hole a water-base drilling fluid according to claim 26.

38. In a process for drilling a bore hole with borehole drilling tools wherein there is circulated in the bore hole a water-base drilling fluid according to claim 27.

39. In a process for drilling a bore hole with borehole drilling tools wherein there is circulated in the bore hole a water-base drilling fluid according to claim 28.

40. In a process for drilling a bore hole with borehole drilling tools wherein there is circulated in the bore hole a water-base drilling fluid according to claim 29.

41. In a process for drilling a bore hole with borehole drilling tools wherein there is circulated in the bore hole a water-base drilling fluid according to claim 30.

42. In a process for drilling a bore hole with borehole drilling tools wherein there is circulated in the bore hole a water-base drilling fluid according to claim 31.

43. In a process for drilling a bore hole with borehole drilling tools wherein there is circulated in the bore hole a water-base drilling fluid according to claim 32.

* * * * *